United States Patent Office 2,714,602
Patented Aug. 2, 1955

2,714,602

HYDROXYLATION OF VINYLCYCLOHEXENE

Leslie Stephen Abbott, Banstead, England, assignor to The Distillers Company Limited, Edinburgh, Scotland, a British company No Drawing. Application April 18, 1950,
Serial No. 156,722

Claims priority, application Great Britain April 26, 1949

17 Claims. (Cl. 260—410)

The present invention relates to the hydroxylation of vinylcyclohexene by novel methods, and to useful compounds and derivatives thereof produced by and in the course of such hydroxylation.

It is known that 1-vinylcyclohexene-3, which is readily obtained by the dimerisation of butadiene, may be converted to the dioxide by dehydrochlorination of the corresponding chlorhydrin derivative, and that the dioxide may be hydrolysed to give the corresponding saturated tetrol which may in turn be esterified with acetic acid to give the tetracetate.

We have now found that one or both of the double bonds of 1-vinylcyclohexene-3 may be hydroxylated with the aid of performic or peracetic acid.

According to a preferred embodiment of this invention 1-vinylcyclohexene-3 is reacted at 35 to 90° C. with up to about 1 molar proportion of the peracid in solution in the corresponding carboxylic acid, with or without an acidic esterification catalyst, to give the monoester of the corresponding glycol which may be hydrolysed, if desired, to give the glycol itself and/or esterified, and/or etherified. Alternatively or subsequently, the vinylcyclohexene mono-glycol or preferably, an ester or ether derivative thereof may be submitted to a similar reaction to give the corresponding tetrol or its ester or ether derivatives.

According to another embodiment of this invention 1-vinylcyclohexene-3 is reacted at 35 to 95° C. with more than one molar proportion, preferably about 2 molar proportions, of the peracid in solution in the corresponding carboxylic acid, with or without an acidic catalyst, to give the diester of the corresponding tetrol which may be hydrolysed, if desired, to give the monoester or tetrol itself, and/or esterified, and/or etherified.

Furthermore, any of the above mentioned reactions with peracids may be modified by the incorporation of a lower aliphatic alcohol such as methanol, ethanol, propanol or isopropanol, when employing a mineral acid catalyst, or by the incorporation of an inert solvent, for example, a chlorinated aliphatic hydrocarbon solvent such as chloroform when employing no such acidic catalyst, with the production of the corresponding hydroxy ether or of the oxide, respectively.

Valuable new compounds can also be produced by hdyrogenation of the vinylcyclohexene monoxide, mono-glycol, and monoglycol ether and ester derivatives, and these new compounds may be subjected to hydrolysis, esterification and/or etherification where appropriate.

In effecting the reaction between vinylcyclohexene or any of the above mentioned unsaturated derivatives and per acetic acid, it is preferred that the latter should be preformed and be sufficiently free from water to give a homogeneous mixture, this being assisted by concentration under reduced pressure and the presence of an excess of the corresponding fatty acid. In the case of performic acid, homogeneity is less important, and the peracid may be formed in situ, if desired, by the addition of relatively concentrated hydrogen peroxide, for example of 35% strength or preferably stronger.

The following 21 examples illustrate the production of the mono-glycol and its derivatives, the vinylcyclohexene referred to being 1-vinylcyclohexene-3.

Example 1

328 grams of a solution of peracetic acid in acetic acid, containing 1 mole of the peracid, were mixed with 10 ml. of sulphuric acid and added slowly with vigorous stirring to 108 grams (1 mole) of vinylcyclohexene previously warmed to 45° C. The mixture was left at 45 to 56° C. for 4 hours after which no further diminution in peroxide concentration took place, and then 17 grams of anhydrous sodium acetate was added and the mixture was distilled under 40 mm. Hg pressure to remove 20 grams of vinylcyclohexene together with the bulk of the acetic acid present. The mixture was diluted with chloroform, filtered, washed with water and distilled to give 86 grams of vinylcyclohexane-3:4-diol monoacetate distilling at 110° to 118° C. under 2-3 mm. Hg pressure, $n_D^{20}$ 1.4766, corresponding to 54% yield on the vinylcyclohexene consumed. The acetoxy content of this product was 34.8% compared with the theoretical 32%.

If preferred, in carrying out this example, the reaction product may be poured into water, followed by neutralisation of both layers, extraction of the water layer with chloroform and distillation of the dried combined oil and chloroform layers, instead of being subjected to a preliminary distillation after neutralisation with sodium acetate.

Example 2

27 grams of vinylcyclohexene-3 dissolved in acetic acid was mixed with 30 ml. of a ground sulphonated carbonaceous hydrogen ion exchange resin (sold under the trade name Zeokarb-215) and 53.8 ml. of 5.2 molar peracetic acid in acetic acid was run into this mixture at 40° C., the reactants then being maintained at 40° to 45° C. for 12 hours. The filtered mixture was subsequently refluxed for 3 hours to remove residual peroxides, washed with sodium bicarbonate solution, extracted with chloroform and distilled to give a 31.5% yield of the 1-vinylcyclohexane-3:4-diol monoacetate.

Example 3

A mixture of 1.3 ml. of sulphuric acid with 100 ml. of formic acid and 27.5 ml. of 100-volume hydrogen peroxide (¼ mole) was allowed to stand for 20 minutes at 20° C. and then added slowly, while stirring, to 28 grams of vinylcyclohexene-3 at 40° C., keeping the reactants at 40 to 45° C. Stirring was continued for 1 hour at this temperature, after which all the peroxide had been consumed. The mixture was neutralised with sodium carbonate, concentrated under vacuum, dissolved in ethanol, filtered, stripped of ethanol under vacuum, dissolved in butanol, filtered, striped of butanol under vacuum and distilled to give 18 grams of the 3:4-monoglycol monoformate.

Example 4

A mixture of 14.25 ml. of 100-volume hydrogen peroxide and 45 ml. of glacial acetic acid was heated to 80° C. for 1 hour and 0.2 grams of tungsten trioxide were dissolved therein. The solution, containing the equivalent of 120.8 millimols of peroxidic oxygen, was stirred at 70° C. with 10.8 grams (100 millimols) of vinylcyclohexene-3. The peroxide was substantially consumed after 5 hours when analysis showed the presence in the product of 15.7 millimols of unchanged vinylcyclohexene together with 75.9 milli-equivalents of glycol by per-iodate titration, corresponding to a yield of 10.8 grams or 90% on the vinylcyclohexene consumed. The bulk of the product, after evaporating some of the water and acetic acid under reduced pressure, was boiled for 1 hour with an excess of aqueous caustic soda and the solution was then saturated with potassium carbonate which caused the precipitation of the free vinyl cyclohexan-3:4-diol as an oil. This was isolated by extraction with ether and found to have a boiling point of 112° to 115° C. under 1 mm. Hg. pressure, melting point 29° to 33.5° C. and $n_D^{20}$ 1.5027 in the liquid state. The bis-3:5-dinitro-benzoate had a melting point of 83° to 85° C.

The vinylcyclohexane-3:4-diol may be produced from the ester by hydrolysis, for example, as illustrated in Examples 4 and 5.

If desired, any of the above hydroxylation examples could be conducted in the presence of a polymerisation inhibitor such as nitrobenzene or picric acid, this sometimes resulting in an improved efficiency of conversion and a product of improved purity.

*Example 5*

50 grams of vinylcyclohexane-3:4-diol monoacetate were refluxed with 75 grams of potassium hydroxide in 425 ml. of absolute alcohol for 4 hours. The alcohol was removed under reduced pressure, chloroform was added and the mixture was filtered, washed, the washings were extracted with chloroform and the combined chloroform layers were stripped under reduced pressure and distilled to give 21 grams (39%) of the glycol. The product of this example boiled under 1 mm. Hg pressure at 120° to 122° C. and had a melting point of 21° to 21.5° C.

The vinylcyclohexane-3:4-diol and its esters may be esterified as illustrated in Examples 6 to 10 or by ester interchange.

*Example 6*

5.5 grams of vinylcyclohexan-3:4-diol monoacetate were dissolved in 27.5 grams of pyridine and 5.2 grams of benzoyl chloride were added, pyridine hydrochloride being percipitated. The mixture was allowed to stand for 1 hour, diluted with aqueous acetic acid to remove the remaining pyridine completely, extracted with chloroform, stripped under reduced pressure and distilled to give 4 grams of the monobenzoate monoacetate, boiling under 1–2 mm. Hg at 179 to 180° C., $n_D^{20}$ 1.5213.

*Example 7*

2.8 grams of vinylcyclohexane-3:4-diol were dissolved in 40 ml. of pyridine, treated with 5.1 ml. of benzoyl chloride and worked-up as in Example 6 to give the viscous dibenzoate boiling under 1–2 mm. Hg 221° to 222° C., $n_D^{20}$ 1.5548.

*Example 8*

48 grams of vinylcyclohexane-3:4-diol monoacetate were heated for 2 hours at 50° C. and then for ½ an hour at 90° C. with 40 grams of acetic anhydride and 60 grams of pyridine. The resulting mixture was poured into water and shaken; the oil layer was separated and washed with water, followed by aqueous acetic acid to remove pyridine, taken up in chloroform, again washed with water, dried, stripped under reduced pressure and distilled to give 50.6 grams of 86% yield of the vinylcyclohexan-3:4-diol diacetate, $n_D^{20}$ 1.4608.

*Example 9*

14.2 grams of vinylcyclohexane-3:4-diol were mixed with 80 grams of pyridine and 32.6 grams of caprylyl chloride were added slowly at below 40° C. The mixture was maintained at 40° to 50° C. for 1 hour, filtered, ether was added to the filtrate, and this was filtered in turn. The precipitates were washed with ether and the combined washings and the main ether fractions combined, washed with dilute hydrochloric acid to remove pyridine, neutralised, washed and dried. On stripping under reduced pressure and distillation, 28 grams of the mobile dioctanoate were obtained, boiling point under 0.5 mm. Hg 172° to 176° C., $n_D^{20}$ 1.4610.

*Example 10*

A mixture of 14.29 grams of vinylcyclohexane-3:4-diol (0.1 mole) 56.7 grams of chloracetic acid (0.6 mole), 100 ml. of benzene and 3.5 grams of paratoluene sulphonic acid was distilled slowly through a column until most of the benzene had been removed. A further 200 ml. of benzene were then added to the mixture and the process was repeated until all the water had been removed. A benzene solution of the residue was washed twice with water, then with dilute sodium bicarbonate solution and then twice with water, dried over sodium sulphate, decolourised with activated carbon, stripped under reduced pressure and distilled to give 21.8 grams of the bis-chlor-acetate, boiling under 1 mm. Hg at 145° to 146° C., $n_D^{20}$ 1.4934.

*Example 11*

26 grams of vinylcyclohexan-3:5-diol were dissolved in 100 grams of chloroform and 32 grams of pyridine, 40 grams of butyryl chloride were added over a period of 15 minutes while keeping the temperature below 50° C., and, after the exothermic reaction had abated, the reaction mixture was refluxed for 1 hour. The product was then washed with dilute hydrochloric acid to remove pyridine, neutralised with dilute sodium bicarbonate solution, washed with water, stripped of chloroform and distilled under reduced pressure to give the dibutyrate, boiling at 140–145° C. under 1 mm. Hg pressure, $n_D^{20}$ 1.468.

By following the same procedure, but using equivalent amount of other acid chlorides, the following vinyl cyclohexan-3:4-diol esters were prepared:

Diheptanoate $n_D^{20}$ 1.460, B. Pt. 190° C. at 2 mm. Hg.
Dicaprate $n_D^{20}$ 1.464, B. Pt. 200–210° C. at 1 mm. Hg.
Dilaurate $n_D^{20}$ 1.465, B. Pt. 210–220° C., at 1 mm. Hg.
Di-2-ethyl-hexanoate $n_D^{20}$ 1.461, B. Pt. 165–175° C., at 1–2 mm. Hg.
Di-2:4:4-trimethyl pentanoate $n_D^{20}$ 1.459, B. Pt. 165–170° C., at 1 mm. Hg.
Dibenzoate $n_D^{20}$ 1.555, B. Pt. 235–238° C., at 1 mm. Hg.
Dicrotonate $n_D^{20}$ 1.499, B. Pt. 140° C. at 1 mm. Hg.

*Example 12*

27.5 grams of lauryl chloride were added slowly to 23 grams of vinylcyclohexan-3:4-diol monoacetate dissolved in 100 millilitres of chloroform containing 11 grams of pyridine, while maintaining the temperature below 40° C. The reaction mixture was allowed to stand at 40° C. for a further half hour and then worked up as described in Example 11 to give, on distillation, the monoacetate monolaurate, boiling at 170–190° C. at 1 mm. Hg pressure. By substituting 21 grams of n-decanoyl chloride for the lauryl chloride, the monoacetate monocaprate was prepared in a similar manner and found to boil at 165–170° C. at 1 mm. pressure.

*Example 13*

20 grams of n-decanoyl chloride were added slowly to 25 grams of vinylcyclohexan-3:4-diol dissolved in 100 millilitres of chloroform and 12 grams of pyridine, while keeping the temperature below 50° C. The reaction mixture was then refluxed for 1 hour and worked up as described in Example 12, to give the monocaprate of the glycol, boining at 170–180° C., under 2 mm. Hg pressure, $n_D^{20}$ 1.469.

The reaction of vinylcyclohexene and peracetic acid in the presence of ethanol is illustrated in Example 14.

*Example 14*

70 grams of vinylcyclohexene were dissolved in ethanol, chilled, and a chilled solution of sulphuric acid in ethanol was added slowly to give a mixture containing 4200 ml. of ethanol and 5% by weight of sulphuric acid based on the ethanol. A mole proportion on the vinylcyclohexene of peracetic acid was then added slowly while stirring, the peracetic acid being a solution in acetic acid of 6.58 molar strength and the addition taking place at 40° to 50° C. during 1½ hours. The mixture was allowed to stand for 12 hours at 40° to 45° C. and then worked-up substantially as described in Example 1 to give 14.5 grams of unchanged vinylcyclohexene and 21.9 grams of the vinylcyclohexane 3:4-diol monoethyl ether, boiling under 1 mm. Hg at 63° C., $n_D^{20}$ 1.4717. The hydroxyl value of this product was 9.7% by weight compared with the calculated value of 10%, and the iodine value was 142 per 100 grams compared with the calculated 149 per 100 grams.

The above described vinylcyclohexane-3:4-diol mono ethyl ether may also be prepared by hydrolysis of the corresponding monoxide, for example by warming with an aqueous strong acid; the preparation of the monoxide is described in Example 15.

Example 15

54 grams of vinylcyclohexene (½ mole) dissolved in 300 ml. of chloroform was treated slowly while stirring at 40° to 50° C. with 1.01 equivalent proportions of a 6 to 7 molar solution of peracetic acid in acetic acid, free from sulphuric acid and containing also free hydrogen peroxide in 0.35 molar concentration. Stirring was continued for 1 hour at this temperature after which a saturated aqueous solution containing 80 grams of sodium carbonate was added slowly with vigorous stirring. The aqueous layer was then separated and extracted with chloroform, and the combined chloroform layers were washed, stripped under reduced pressure and distilled to give 38.9 grams of the colourless vinylcyclohexane-3:4-epoxide, boiling under 20 mm. Hg pressure at 70° to 70.5° C., $n_D^{20}$ 1.4706.

It will be appreciated that a small amount of free hydrogen peroxide is present in most of the peracid solutions employed in these examples.

In the preparation of the vinyl or ethyl cyclohexandiol esters and ethers of this invention, the diol may, if desired, be formed in situ by opening the epoxide ring in the presence of sulphuric acid, as described in Examples 16 and 17.

Example 16

24.8 grams of vinyl-3:4-epoxy-cyclohexane were added to 46 grams of lauric acid containing 3 drops of concentrated sulphuric acid, and the mixture was heated at 100° C. for 5 hours. By the end of this time, some of the epoxide had reacted and the mixture was cooled, taken up in carbon tetrachloride, neutralised with aqueous sodium bicarbonate, separated, washed with water, stripped of solvent and low-boiling materials and distilled to yield 7.5 grams of the monolaurate of the diol, boiling at 160° C. under 1 mm. Hg pressure.

Example 17

46 grams of ethanol containing 2 drops of concentrated sulphuric acid were added slowly to 31 grams of vinyl-2:4-epoxycyclohexane, keeping the temperature below 40° C., and the mixture was allowed to stand for 72 hours. The sulphuric acid was then neutralised with sodium acetate, the excess alcohol removed under reduced pressure, and the residue was taken up in carbon tetrachloride, washed with water, stripped and distilled to give 38 grams of the monoether as described in Example 14.

The diol monoethers may be esterified as described in Example 18:

Example 18

24 grams of lauryl chloride were added slowly to 17 grams of the monoether described in the previous example, dissolved in 8.5 grams of pyridine and 100 millilitres of chloroform, while keeping the temperature below 50° C. The reaction mixture was refluxed for half an hour and worked up as described in Example 11 to give 28 grams of the monethyl ether of vinyl cyclohexan-3:4-diol mono-laurate, boiling at 180° C. under 2 mm. Hg pressure, $n_D^{20}$ 1.459.

Any of the above mentioned unsaturated vinylcyclohexane derivatives may be hydrogenated to give the corresponding ethylcyclohexane derivatives, as described in Examples 19 and 20, and those derivatives may be hydrolysed and/or esterified and/or etherified where appropriate.

Example 19

14.2 grams of vinylcyclohexane-3:4-diol were mixed with 70 ml. of ethanol and 1 gram of palladium-on-chalk catalyst in a 2-necked reaction flask and shaken with hydrogen under substantially atmospheric pressure. 2180 ml. of hydrogen were absorbed and the resulting ethylcyclohexane-3:4-diol was isolated in 83.3% yield (12 grams) as a liquid boiling under 1–2 mm. Hg at 107° to 108° C., $n_D^{20}$ 1.4845. It was identified by mixed melting point of the bis-3:4-dinitrobenzoate, 76° to 77° C., the synthetic product used for identification having been prepared by hydroxylation of 4-ethylcyclohexene derived in turn from 1:2:5:6-tetrahydroacetophenone by a Clemmensen reduction.

Example 20

Vinylcyclohexane-3:4-diol monoacetate was hydrogenated substantially as described in Example 19, to give the ethylcyclohexane diol monoacetate, boiling under 1 mm. Hg pressure at 101 to 102° C., $n_D^{20}$ 1.4632.

Instead of hydrogenating a vinylcyclohexane diol ester to produce the saturated ester, the hydrogenation step may, if desired, precede the esterification as described in Example 21.

Example 21

14.5 grams of vinylcyclohexane-3:4-diol were hydrogenated as described in Example 19, the resulting solution was stripped under reduced pressure and the glycol contained in the residue was esterified without intermediate isolation with 33.5 grams of caprylyl chloride in pyridine at 40° C. for 1 hour. After removing the pyridine by acid washing followed by neutralisation, washing and drying, the product was distilled to give 22.7 grams (57.2%) yield of the fairly mobile ethylcyclohexane-3:4-diol dioctanoate, boiling under 1 mm. Hg at 186–8° C., $n_D^{20}$ 1.4558.

The following examples illustrate steps in the preparation of 1-vinyl-cyclohexene-3 diglycol and its derivatives.

Example 22

330 grams of a solution of peracetic acid in acetic acid containing 1 mole of the peracid were mixed with 10 ml. of sulphuric acid and added slowly with vigorous stirring to 54 grams (½ mole) of vinylcyclohexene and the mixture was maintained at 40° C. until there was no further decrease in peroxide concentration. The product was treated with sodium sulphite to destroy the remaining peroxides and with sodium acetate to neutralise the sulphuric acid, and finally stripped of acetic acid and concentrated under 1 mm. Hg pressure to give a sticky solid in 95 to 100% yield. On heating this under 1 mm. Hg a small amount could be distilled at 220° to 224° C. as a straw coloured semi-solid having an acetoxy value of 45.2% compared with the calculated 45.6% for the diacetate of the ethylcyclohexan-tetrol.

Example 23

16 grams of vinylcyclohexane-3:4-diol were reacted with a molar-equivalent of peracetic acid in acetic acid solution substantially under the conditions described in Example 1. The water and part of the acetic acid was removed under reduced pressure, and the residue was neutralised with sodium acetate, dissolved in chloroform and filtered. A small amount of hydrochloric acid was added to precipitate any sodium salts still present as the chloride, the mixture was filtered, stripped under reduced pressure, dissolved in ethanol, again filtered, refluxed with activated carbon, filtered and stripped under reduced pressure to give 20.1 grams of the ethylcyclohexane tetrol monoacetate (82% yield).

*Example 24*

A mixture of 45.1 grams of 3:4-diacetoxy vinylcyclohexane and 136 ml. of glacial acetic acid was treated with 43 ccs. of a 5.2 molar solution of peracetic acid in acetic acid in the presence of 2 ml. of concentrated sulphuric acid and 1 gram of picric acid, the latter being present to inhibit polymerisation. The mixture was maintained at 45° to 50° C. for 12 hours, dissolved in chloroform, washed with sodium bicarbonate solution and with water, stripped under reduced pressure and distilled to give 27.7 grams of a colourless viscous liquid, boiling under 1 mm. Hg at 180° to 185° C., $n_D^{20}$ 1.4630. The saponification value of this ethylcyclohexane tetrol triacetate was 561 compared with the theoretical value of 560.

*Example 25*

A mixture of 28.5 ml. of 100-volume hydrogen peroxide and 90 ml. of glacial acetic acid was heated for 1 hour at 80° C. and, after cooling, 0.4 gram of tungsten trioxide was dissolved therein. The solution thus obtained, which contained 241 millimols of peroxide, was stirred with 10.8 grams (100 millimols) of vinylcyclohexene at 55° C. and stirred for 5¼ hours, the temperature increasing during the first 25 minutes to 70° C. in the course of the exothermic reaction. At the end of 5¼ hours substantially all of the peroxide and 81.5 millimols of the vinylcyclohexene had been consumed; after hydrolysis of a sample with boiling aqueous caustic soda, titration showed the presence of 96 milliequivalents of glycol in the product, corresponding to a yield of 59% on the vinylcyclohexene consumed.

The bulk of the product after evaporating some of the water and acetic acid under reduced pressure was boiled for 1 hour with an excess of aqueous sodium hydroxide and the solution was then saturated with potassium carbonate which caused the precipitation of the free tetrol as an oil. It was separated by extraction with butanol and, after several reprecipitations from this solvent by the addition of ether, and then from alcoholic solution by addition of acetone, the 1':2':3:4-tetrahydroxy ethylcyclohexane was obtained as an amorphous hygroscopic solid.

*Example 26*

A reaction mixture containing 1-(hydroxyacetoxyethyl)-3:4-diacetoxycyclohexane was prepared as described in Example 24 from 168 grams of vinyl cyclohexane 3:4 diol diacetate without isolation of the triacetate content. The mixture was heated with a slight excess of sodium acetate, based on sulphuric acid, acetic acid was removed under reduced pressure and the reaction mixture was concentrated to 360 ml. Of this, 240 ml. were taken and 22 grams of sodium acetate and 120 ml. of acetic anhydride were added. The mixture was refluxed for 2 hours, cooled, stirred with water and chloroform, the oil layer was neutralised with sodium bicarbonate, the aqueous layer was neutralised and extracted with chloroform and the chloroform layers were combined, washed with water, decolourised with activated carbon, stripped under reduced pressure and distilled to give 8.8 grams of unchanged 3:4-diacetoxy vinylcyclohexane and 118.5 grams of 1':2':3:4-tetra-acetoxy ethyl cyclohexane boiling under 1 mm. Hg at 162–4° C., $n_D^{20}$ 1.4613. The saponification value of this product was 648 compared with the theoretical 651.

*Example 27*

1-(hydroxy-acetoxyethyl)-3:4-diacetoxycyclohexane was refluxed with a 25% excess of alcoholic potassium hydroxide for 2 to 3 hours and the alcohol and most of the water in the reaction product was removed under reduced pressure. The residue was brought to a pH of 4 with 50% aqueous hydrochloric acid, water and excess hydrochloric acid were removed under reduced pressure, alcohol was added and the mixture was digested, allowed to stand, filtered and evaporated to dryness on the waterbath. The dried residue was dissolved in alcohol and precipitated with acetone to give a sticky material which was crystallized by dissolving in 2-ethoxy ethanol, refluxing with activated carbon, filtering, adding rather less acetone than needed to effect precipitation at room temperature and cooling to minus 80° C. The 1':2':3:4-tetrahydroxyethylcyclohexane was thus produced as flocculent crystals which rapidly became sticky on warming to room temperature.

In the preparation of 1':2':3:4-tetrahydroxyethyl-cyclohexane derivatives according to this invention, it is preferred to treat a vinyl cylclohexane diol diester with the peracid rather than the monoester or glycol itself, as the product, being a triester, is then readily distillable and, in addition, the hydroxy groups are shielded from oxidative degradation.

The saturated and unsaturated glycols, esters, ethers and oxides produced in accordance with this invention are variously useful as solvents, plasticizers for synthetic resins and components of alkyd resins. In particular, the diesters of ethyl and vinylcyclohexan-3:4-diol with saturated aliphatic acids of 3–9 carbon atoms wherein the total number of carbon atoms in the acid residues is 8–16 are valuable plasticizers for vinyl chloride polymers and copolymers, and their use in this connection is claimed in copending application No. 11,426/49 corresponding to U. S. Patent No. 2,553,996, issued May 22, 1951. Examples of such diesters are the dibutyrate, the dicaproate, the dioctanoates, the monononanoate monopropionate and the monocaproate monobutyrate. The mixed esters may be prepared by two-stage esterification of the diol or, alternatively, by opening the epoxide ring in the presence of one acid followed by esterification of the resulting monoester.

The compounds which may be prepared by the process of the present invention have the general formulae:

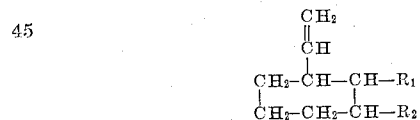

and

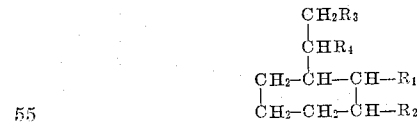

where $R_1$ and $R_2$ are oxy linkages and may represent the same oxy link in the case of an epoxide, while $R_3$ and $R_4$ may have the same definition as $R_1$ and $R_2$ or may be hydrogen.

I claim:

1. A process step for the production of compounds selected from the group consisting of vinyl cyclohexan-3:4-diol, and its nuclear substituted ethers, esters, ether-esters and epoxides which consists in reacting 1-vinyl-cyclohexen-3 with up to about 1 molar equivalent of an acid selected from the group consisting of performic and peracetic acid dissolved in the corresponding carboxylic acid.

2. A process step as set forth in claim 1, wherein performic acid is employed and is prepared from formic acid and hydrogen peroxide.

3. A process step as set forth in claim 1, wherein peracetic acid which has been preformed and partially dehydrated is employed.

4. A process step as set forth in claim 1, wherein about 1 molar equivalent of the peracid is employed at 35–95° C. in the presence of a catalytic amount of an acidic esterification catalyst.

5. A process step as set forth in claim 1, wherein the reaction is effected in solution in an alkanol of 1–3 carbon atoms, in the presence of a catalytic amount of an acidic esterification catalyst, at a temperature of 35–95° C.

6. A process for the production of a monoester of vinylcyclohexan-3:4-diol which comprises reacting vinylcyclohexen-3:4 with about one molar proportion of a peracid selected from the group consisting of performic and peracetic acid, dissolved in the corresponding carboxylic acid, at a temperature of 35–95° C.

7. A process for the production of vinyl cyclohexan-3:4-diol which comprises hydrolysing a monoester of claim 6.

8. A process for the production of diesters of vinyl cyclohexan-3:4-diol which comprises the step of reacting vinylcyclohexen-3:4 with about 1 molar proportion of a peracid selected from the group consisting of performic and peracetic acid, dissolved in the corresponding carboxylic acid, at a temperature of 35–95° C., the step of hydrolysing the monoester so produced, and the step of esterifying the resultant diol.

9. A process as set forth in claim 8, wherein said peracid is performic acid and said esterification step is effected with butyryl chloride.

10. As a new composition of matter, an aliphatic diester of vinyl cyclohexan-3:4-diol, wherein each fatty acid residue has 3–9 carbon atoms and the total number of carbon atoms in the two residues is 8–16.

11. As a new composition of matter, an aliphatic diester of ethyl cyclohexan-3:4-diol, wherein each fatty acid residue has 3–9 carbon atoms and the total number of carbon atoms in the two residues is 8–16.

12. As a new composition of matter derivatives of 1-vinyl-cyclohexene-3 of the following formula

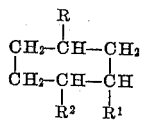

wherein R is selected from the group consisting of vinyl and ethyl radicals, and $R^1$ and $R^2$ are selected from the oxy group consisting of hydroxy, alkoxy and acyloxy radicals each having not more than 12 carbon atoms respectively in each of the alkyl and acyl groups but said hydroxy radicals being only included in said oxy group when R is vinyl.

13. As a new composition of matter, vinyl cyclohexan-3:4-diol.

14. As a new composition of matter, ethylcyclohexan-3:4-dioctanoate.

15. As a new composition of matter, ethyl cyclohexan-3:4-dibutyrate.

16. A process for the production of diesters of ethyl cyclohexan-3:4-diol which comprises, the step of reacting vinylcyclohexen-3:4 with about 1 molar proportion of a peracid selected from the group consisting of performic and peracetic acid, dissolved in the corresponding carboxylic acid, at a temperature of 35–95° C., in the presence of a catalytic amount of sulphuric acid, the step of hydrolysing the monoester so porduced, the step of esterifying the resultant diol, and hydrogenating the resultant esterified diol to produce a diester of ethyl cyclohexan-3:4-diol.

17. A process for the production of ethyl derivatives of vinyl cyclohexan-3:4-diol and its nuclear substituted ethers, esters, ether-esters and epoxides, which comprises reacting 1-vinyl-cyclohexen-3 with up to about 1 molar equivalent of an acid selected from the group consisting of performic and peracetic acid dissolved in the corresponding carboxylic acid, and hydrogenating the resulting vinyl cyclohexan-3:4-diol.

References Cited in the file of this patent
UNITED STATES PATENTS

| | | |
|---|---|---|
| 2,146,655 | Sherrard | Feb. 7, 1939 |
| 2,458,484 | Terry | Jan. 4, 1949 |
| 2,460,195 | Segall | Jan. 25, 1949 |
| 2,500,016 | Allenby | Mar. 7, 1950 |
| 2,541,670 | Segall et al. | Feb. 13, 1951 |
| 2,553,996 | Abbott | May 22, 1951 |
| 2,571,208 | Craig | Oct. 16, 1951 |

OTHER REFERENCES

Lebedev et al., J. Russian Phys. Chem. Soc. 45, 1249 (1913).
Swern, Chem. Rev., August 1944, vol. 45, pgs. 23–25.
Mousseron CA 41, p. 5115 (1947).
Whitmore, Organic Chem. Nostrand, 2nd ed. (1951), p. 554.